United States Patent
Jensen et al.

(10) Patent No.: US 10,373,231 B2
(45) Date of Patent: Aug. 6, 2019

(54) SYSTEM AND METHOD FOR SOCIAL STYLE MAPPING

(71) Applicant: Snap+Style, Inc, Washington, DC (US)

(72) Inventors: Anna Jensen, Washington, DC (US); Raul Fernandez, Potomac, MD (US); Gary Myers, Aldie, VA (US); William McComb, Princeton, NJ (US)

(73) Assignee: SNAP+STYLE, INC, Washington, DC (US)

( * ) Notice: Subject to any disclaimer, the term of this patent is extended or adjusted under 35 U.S.C. 154(b) by 647 days.

(21) Appl. No.: 14/806,345

(22) Filed: Jul. 22, 2015

(65) Prior Publication Data

US 2016/0027088 A1    Jan. 28, 2016

Related U.S. Application Data

(60) Provisional application No. 62/027,388, filed on Jul. 22, 2014.

(51) Int. Cl.
| | |
|---|---|
| *G06Q 30/00* | (2012.01) |
| *G06Q 30/06* | (2012.01) |
| *G09B 19/00* | (2006.01) |
| *G06F 16/583* | (2019.01) |

(52) U.S. Cl.
CPC ..... *G06Q 30/0631* (2013.01); *G06F 16/5838* (2019.01); *G06Q 30/0641* (2013.01); *G06Q 30/0643* (2013.01); *G09B 19/0023* (2013.01)

(58) Field of Classification Search
None
See application file for complete search history.

(56) References Cited

U.S. PATENT DOCUMENTS

| | | | |
|---|---|---|---|
| 9,401,032 B1* | 7/2016 | Dorner | G06T 11/001 |
| 2011/0142335 A1* | 6/2011 | Ghanem | G06F 17/3025 |
| | | | 382/165 |
| 2013/0182002 A1* | 7/2013 | Macciola | H04N 1/387 |
| | | | 345/589 |
| 2013/0314534 A1* | 11/2013 | Hinman | G06Q 10/08 |
| | | | 348/143 |
| 2014/0035913 A1* | 2/2014 | Higgins | G06T 17/00 |
| | | | 345/420 |
| 2014/0180864 A1* | 6/2014 | Orlov | G06Q 30/0631 |
| | | | 705/26.7 |

(Continued)

OTHER PUBLICATIONS

Cheng, Ching-I, A Decision Making Framework for Dressing Consultant, Apr. 1, 2007, 2007 IEEE Symposium on Computational Intelligence in Multi-Criteria Decision-Making, pp. 267-271 (Year: 2007).*

*Primary Examiner* — Michael Misiaszek
*Assistant Examiner* — Timothy J Kang
(74) *Attorney, Agent, or Firm* — Resolute Legal PLLC

(57) ABSTRACT

A system is disclosed that obtains an image of an apparel item and text describing the apparel item. The system also determines descriptive metadata of the apparel item by extracting information from the text. Further, the system further determines categorization metadata of the apparel item by analyzing the image. Additionally, the system stores the image, the descriptive metadata, and the categorization metadata in a virtual closet. Moreover, the system provides a recommendation of an outfit from a stylist to a user based on the virtual closet.

16 Claims, 9 Drawing Sheets

(56) References Cited

U.S. PATENT DOCUMENTS

| | | | |
|---|---|---|---|
| 2014/0279186 A1* | 9/2014 | Juan | G06Q 30/0631 705/26.7 |
| 2014/0337345 A1* | 11/2014 | Motoyama | G06F 3/0604 707/738 |
| 2015/0170250 A1* | 6/2015 | Dalal | G06Q 30/0643 705/26.7 |

* cited by examiner

SYSTEM AND METHOD FOR SOCIAL STYLE MAPPING

CROSS-REFERENCE TO RELATED APPLICATIONS

This application claims priority to U.S. Provisional Patent Application No. 62/027,388, which was filed on Jul. 22, 2014, the contents of which are incorporated herein by reference in their entirety.

BACKGROUND

Numerous attempts have been made to provide services for fashion over the Internet. For example, some services generate personalized shopping plans by collecting images of the user and creating models of the user dressed in various pieces of apparel. Other services provide a mechanism for storing a user's clothing in a virtual wardrobe closet that allows the user to gather separate articles of clothing to form a coordinated outfit. However, such services are limited because they are unidirectional. For example, they suggest items without accounting for the user's existing wardrobe. Hence, these services do not provide fashion inspiration, validation, and empowerment that users desire.

SUMMARY

The present disclosure is directed to a specialized system that remotely manages wardrobes of individuals via an information network. In accordance with aspects of the present disclosure, the system obtains, via an information network, an image of an apparel item and text describing the apparel item. The system also determines descriptive metadata of the apparel item by extracting information from the text. Further, the system determines categorization metadata of the apparel item by analyzing the image. Additionally, the system stores the image, the descriptive metadata, and the categorization metadata in a virtual closet. Moreover, the system provides, via the information network, a recommendation of an outfit from a stylist to a user based on the virtual closet.

DRAWINGS

The foregoing summary as well as the following detailed description is better understood when read in conjunction with the appended drawings. For the purpose of illustrating the invention, the drawings detail exemplary constructions of the invention; however, the invention is not limited to the specific methods and systems disclosed herein.

DETAILED DESCRIPTION

The present disclosure is generally directed to a specialized system that remotely manages wardrobes of individuals via an information network. In accordance with aspects of the present disclosure, the system stores personal wardrobes of users in virtual closets and links the users with stylists (e.g., individual or automated) that combine existing items in the personal wardrobes and/or new items that can be purchased from retailers. By using a wide-area network (e.g., the Internet) to link remotely located stylists with the personal wardrobes of users and with items (e.g., apparel, including accessories) available from retailers, systems in accordance with the present disclosure address the technical challenge of sharing information among users, retailers, and stylists over the Internet. Additionally, systems in accordance with the present disclosure address the technical challenge of transforming the information received from the users and the retailers into a new representation that enables efficient and accurate matching of items for providing fashion recommendations to users.

Figure 1:
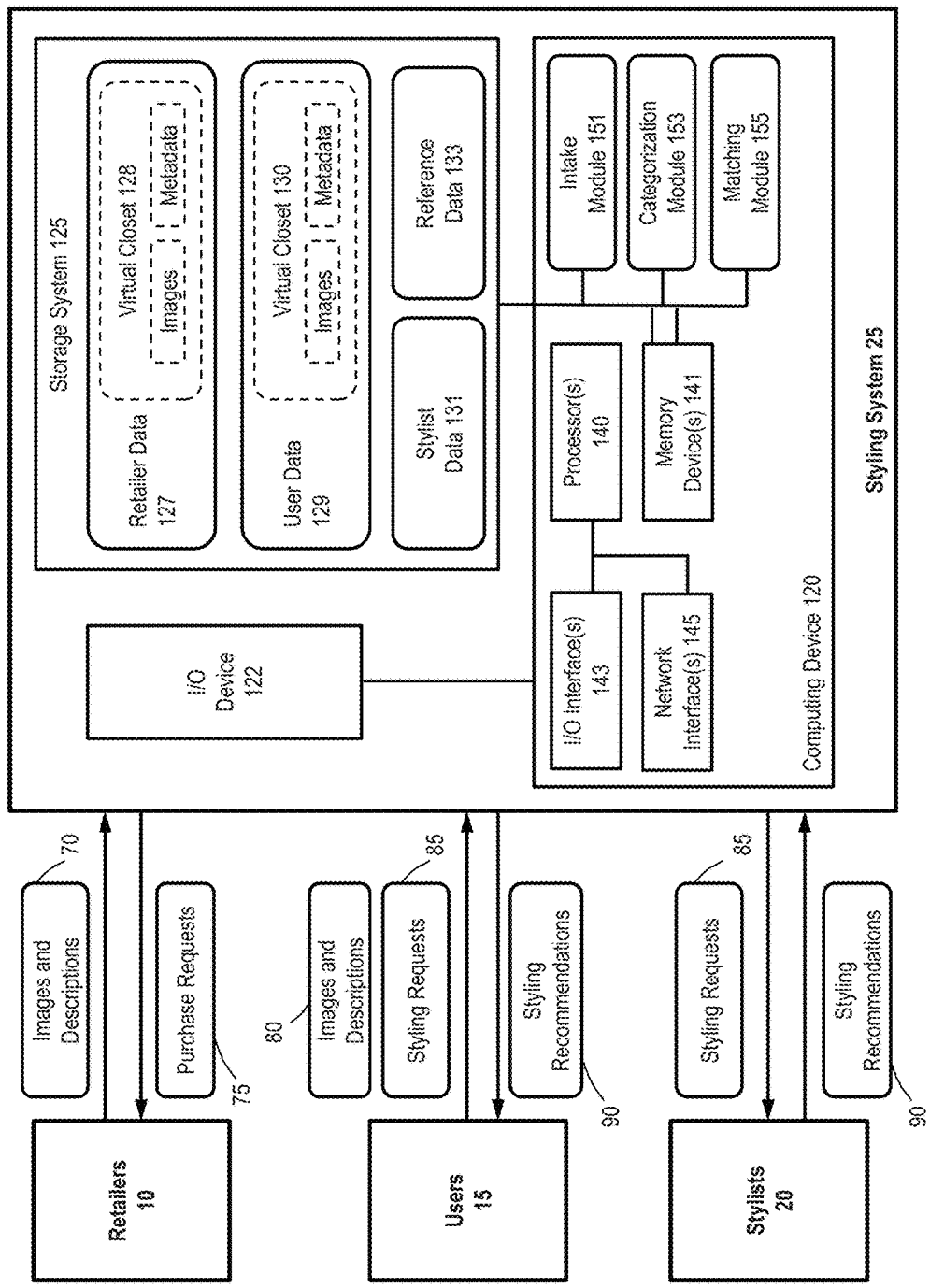
FIG. 1 illustrates a block diagram of an exemplary environment for implementing a system in accordance with aspects of the present disclosure.

FIG. 1 illustrates a block diagram of an environment for implementing systems and processes in accordance with aspects of the present disclosure. The environment includes one or more retailers 10, one or more users 15, one or more stylists 20, and a styling system 25, each of which can be remotely located and communicatively linked via an information network (e.g., the Internet). The retailers 10 can be merchants of apparel items, which include clothes, footwear, accessories, jewelry, fashion products, and the like. The users 15 can be consumers of such apparel items. The stylists 20 can be individuals employed or contracted by the retailers 10 and/or an operator of the styling system 25 that provide recommendations to the users 15 regarding combinations of apparel items.

In embodiments, the styling system 25 creates, maintains, and/or curates virtual closets that can mix and match apparel items from the retailers 10 with apparel items already in a wardrobe of particular one of users 15. For example, each of the retailers 10 can provide images (e.g., photographs) and respective descriptions 70 describing apparel items available to purchase to the styling system 25, which are stored in virtual closets (e.g., virtual closet 128). Additionally, each of the users 15 can provide images and respective descriptions 80 describing apparel items in their personal wardrobes to create virtual closets (e.g., virtual closet 130). The virtual closets can be stored at the styling system 125 or locally at the retailers 10 and users 15.

In accordance with aspects of the present disclosure, the users 15 can populate their virtual closets with purchases from the retailers 10 based on recommendations provided by one or more of the stylists 20 using information generated by the styling system 25. Moreover, in response to styling requests 85 from the users 10, the retailers 10 and/or stylists 20 can push (e.g., periodically suggest) recommendations 90 to the users 15 based on new arrivals and/or updates to retailer-specific items.

In accordance with aspects of the present disclosure, the styling system 25 includes hardware and software that perform the processes and functions described herein. In particular, the styling system 25 includes a computing device 120, an input/output (I/O) device 122, and a storage system 125. The I/O device 122 can include any device that enables the retailers 10, the users 15, and/or the stylists 20 to interact with the computing device 120 (e.g., a user interface) and/or any device that enables the computing device 120 to communicate with the retailers 10, the users 15, and/or the stylists 20 using any type of communications link. In embodiments, the communications link includes a wide-area network, such as the Internet. The I/O device 122 can be, for example, a touchscreen display, pointer device, keyboard, etc.

The storage system 125 can comprise a computer-readable, non-volatile hardware storage device that stores information and computer-readable program instructions. For example, the storage system 125 can be one or more flash drives and/or hard disk drives. In accordance with aspects of the present disclosure, the storage system 125 stores retailer data 127, user data 129, stylist data 131, and reference data 133. In accordance with aspects of the present disclosure, the retailer data 127, and the user data 129 include virtual closets 128 and 130, which include images having respective metadata describing the subject matter of the images (e.g., information describing items of clothing depicted in a respective one of the images).

In accordance with aspects of the present disclosure, the information stored in the retailer data 127 and user data 129 can be updated, managed, and/or curated by their respective retailers 10 and/or users 15 (via, e.g., I/O interface 122). For each user 15, the user data 129 can include items owned by the user. Additionally, the information stored in user data 129 can include one or more wish lists for items that the user does not yet own, but has identified for purchase. For example, the user can selectively add items to the wish list based on a recommendation from a stylist 20 and/or based on personal selections from online catalogs of the retailers 10. Further, the information stored in user data 129 can include collections (e.g., virtual suitcases) of items selected by the user as belonging to a common theme (e.g., items for a beach vacation). Still further, the information stored in the user data 129 can include matched sets (e.g., virtual outfits), which are a collection of clothing items that are brought together to form combinations with some fashion sense. Note that a matched set may be comprised of both owned and new items and still "saved" to the user's closet. The matched sets can include recommended outfits, which are outfits that may be recommended to the user 15 by a stylist 20. If the user 15 likes the recommended outfit they may be able to save it to their closet.

In embodiments, the computing device 120 includes one or more processors 140 (e.g., microprocessor, microchip, or application-specific integrated circuit), one or more memory devices 141 (e.g., RAM and ROM), one or more I/O interfaces 143, and one or more network interfaces 145. The memory device 141 can include a local memory (e.g., a random access memory and a cache memory) employed during execution of program instructions. Additionally, the computing device 120 includes at least one communication channel (e.g., a data bus) by which it communicates with the I/O device 122 and the storage system 125.

The processor 140 executes computer-readable program instructions for an operating system and application programs, which can be stored in the memory device 141 and/or storage system 125. Moreover, the processor 140 can execute computer-readable program instructions stored in the memory devices 141 or the storage system 125 for an intake module 151, a categorization module 153, and a matching module 155. In accordance with aspects of the present disclosure, the intake module 151 can receive images from, e.g., the retailers 10 and the users 15, and process the images to, e.g., crop the images, rescale the images, remove backgrounds from the images, rescale the images, and normalize the light and/or coloring of the images. In embodiments, removing a background comprises entirely removing elements in an image that are not part of a apparel item depicted in the image such that only they apparel item and a substantially uniform (e.g., monochrome) background remain in the image.

In accordance with aspects of the present disclosure, the categorization module 151 can process images received by the intake module to generate metadata (e.g., tags) that describes, classifies, and/or categorizes the images. In embodiments, the categorization module 153 may use computer vision to automatically generate the metadata from received images. For example, given an image of a shirt, the categorization module 153 may analyze the image and output tags, such as shirt, long-sleeve, button-down, vertical stripes, etc. The categorization module 153 can include both a feature matcher to look at specific clothing features as well as a representation-based matcher that utilizes a catalog of clothing to build representative samples of different categories of clothing to assist in matching.

In accordance with aspects of the present disclosure, the matching module 155 can determine matches between items contained in the retailer data 127 and/or the user data 129. For example, for an item identified by a user 15 in a styling request 85, the matching module 155 may provide a confidence-ranked selection of matching clothing from the retailers 10 or the personal wardrobe of the user 15. The matching can be performed manually by the stylists 20, and/or automatically by the matching module 155. In embodiments, the logic of the matching module 155 goes beyond rule-based decisions. For example, the matching module 155 can take into account combined colors and patterns. Further, the matching module 155 can be built to understand current and seasonal fashion trends to ensure the suggestions are up to date. Moreover, the matching module 155 can take into account both the user's personal wardrobe and retail catalogs to match items that are wholly owned by the user, items that are completely new, or any combination in-between.

The computing device 120 can comprise any general purpose computing article of manufacture capable of executing computer program instructions installed thereon (e.g., a personal computer, server, etc.). However, the computing device 120 is only representative of various possible equivalent-computing devices that can perform the processes described herein. To this extent, in embodiments, the functionality provided by the computing device 120 can be any combination of general and/or specific purpose hardware and/or computer program instructions. In each embodiment, the program instructions and hardware can be created using standard programming and engineering techniques, respectively.

Figure 2:
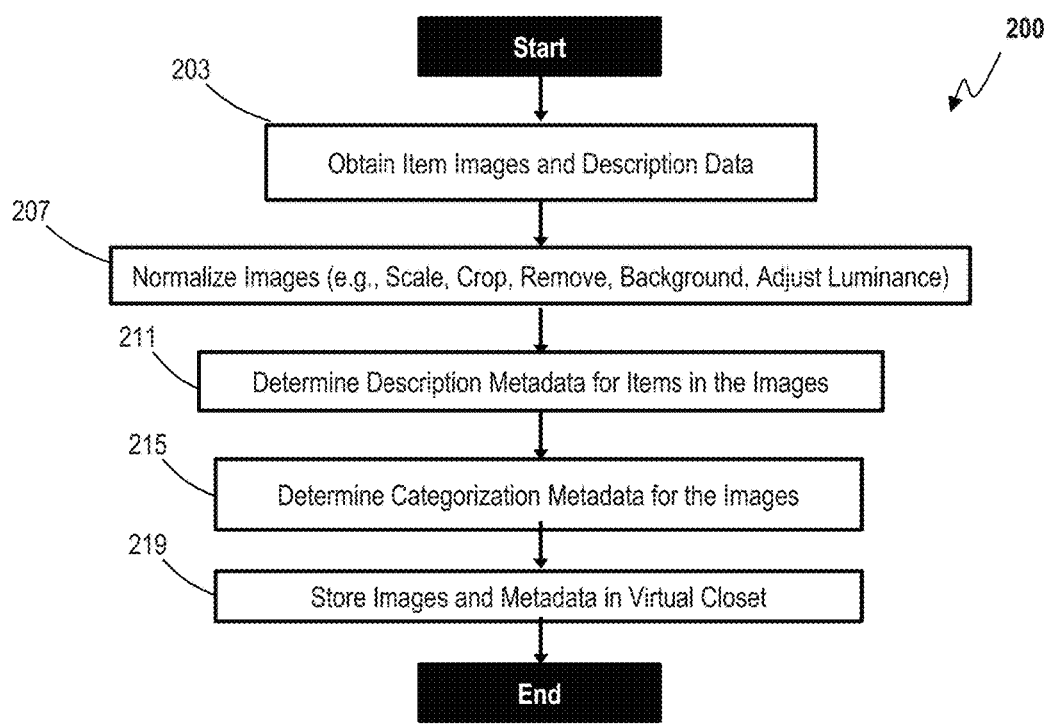
FIG. 2 illustrates an flow diagram of an exemplary intake process in accordance with aspects of the present disclosure.

FIG. 2 illustrates an exemplary flow diagram of an intake process in accordance with aspects of the present disclosure. At 203, the process 200 (which may be, e.g., performed by execution of intake module 151 by processor 140) obtains items images and associated description data. The images can be obtained from one or more retailers (e.g., retailers 10) and/or one or more users (e.g., users 15). The description data can be information, including item name, gender, type (e.g., pants, tops, skirt, active wear, bags, blazers, suits, coats and jackets, dresses, intimates and sleepwear, jeans, jewelry, jumpsuits and rompers, shoes, shorts, sweaters, etc.), use category (e.g., work, formal, casual, etc.), material (e.g., silk, cotton, wool, polyester), season (e.g., spring, summer, winter, fall, holiday, etc.), and measurements (e.g., size and/or physical dimensions).

At 207, the process 200 (e.g., by execution of the intake module 151) normalizes the images obtained at 203. In embodiments, the normalizing includes cropping and/or scaling the images to a standard size. Additionally, the normalizing can include normalizing the luminance of the images. Further, the normalizing can include removing backgrounds from the images.

At 211, the process 200 (e.g., by execution of the categorization module 153) determines descriptive metadata for items in the images obtained at 203. In embodiments, the metadata can be extracted from text of the descriptive information received with images. For example, the text can be obtained by character recognition or included in a data file (e.g., a JSON file). In embodiments, the text can be recognized by performing a bag-of-words search for predetermined words and phrases or by using natural language processing.

At 215, the process 200 (e.g., by execution of the categorization module 153 by the processor 140) determines categorization metadata for the images normalized at 211. In embodiments, the categorization metadata can be determined by analyzing the images using computer intelligence to categorize the images based on color and type. For example, based on a color model, the items in the images can be categorized into one or more of a number (e.g., 26) color categories. Additionally or alternatively, based on type model, the apparel in the images can be categorized into one or more apparel types (e.g., shirt, jacket, pants, skirt, dress, accessory, etc.) Further, for each of the color model and/or the type model, the process 200 can determine a confidence value associated with each of the determined colors and types. The confidence value can represent a probability that the determined color or type is correct.

At 219, the process 200 stores the categorization metadata determined at 215 in association with the respective images normalized at 207. Where the images are obtained form a retailer (e.g., retailers 10), the images, and the respective metadata can be stored in retailer data (e.g., retailer data 127 in storage system 125), and can be associated together a virtual closet (e.g., virtual closet 128). Where the images are obtained form a user, the images and the respective metadata can be stored in user data (e.g., user data 129 in storage system 125), and can be associated together a virtual closet (e.g., virtual closet 130).

Figure 3:
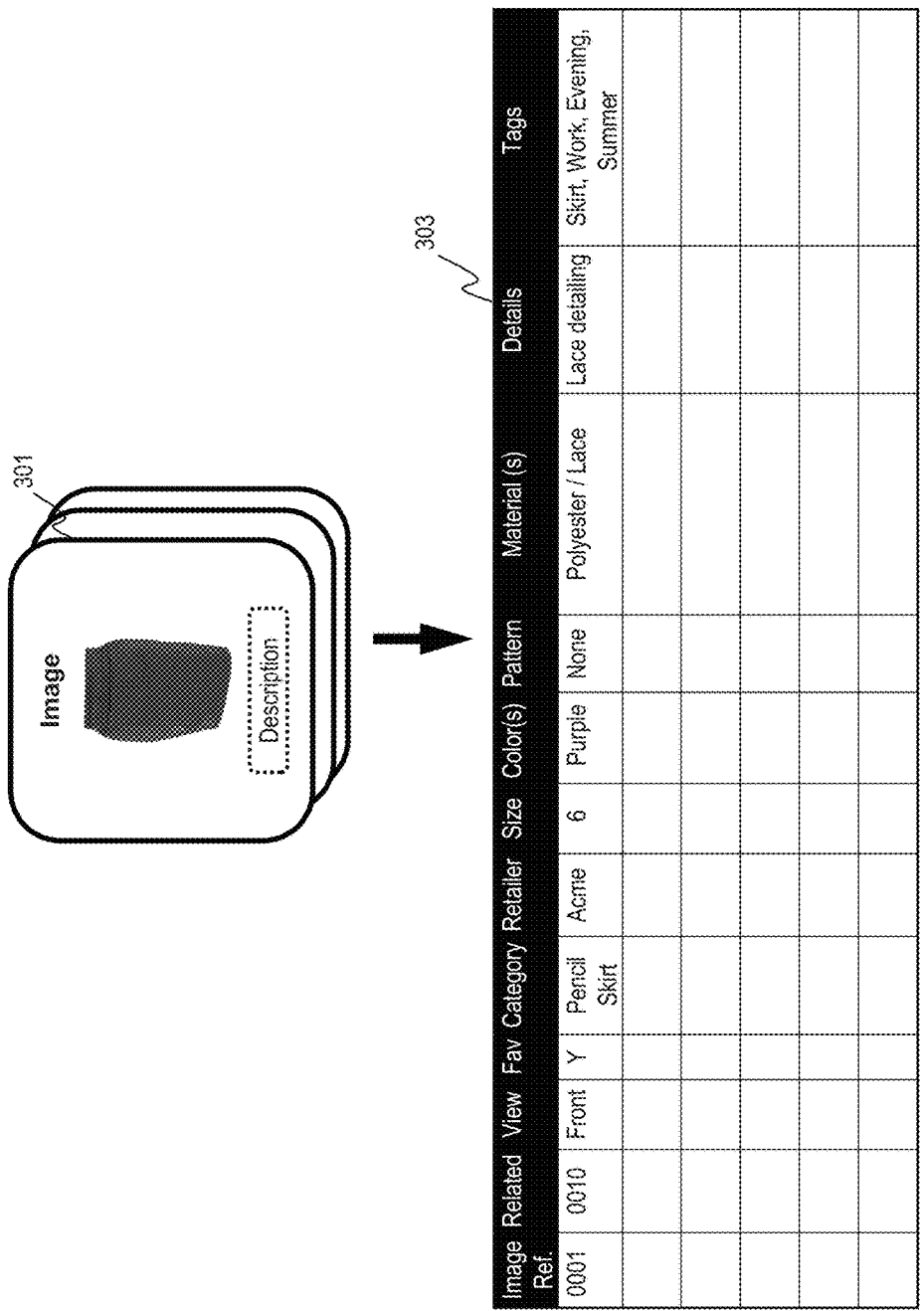
FIG. 3 illustrates exemplary data structures in accordance with aspects of the present disclosure.

FIG. 3 illustrates exemplary data structures in accordance with aspects of the present disclosure. In embodiments, the data structures include images 301 and metadata 303. The images 301 and the metadata 303 can be the same or similar to those previously disclosed herein. For example, an image 301 may be of a skirt that is associated with descriptive information. The metadata 303 can include information extracted from the description (e.g., by intake module 151) and information extracted from the image 301 (e.g., by categorization module 153). Additionally, the metadata 303 can include information relating the item in the image 30 to one or more other items ("related") determined by the matching module 155. While FIG. 3 only shows details of one image and a corresponding metadata record for the sake of illustration, it is understood that there can be a large number of images and metadata records (e.g., tens, hundreds, thousands, etc.) corresponding to each user (e.g., users 10).

Figure 4:
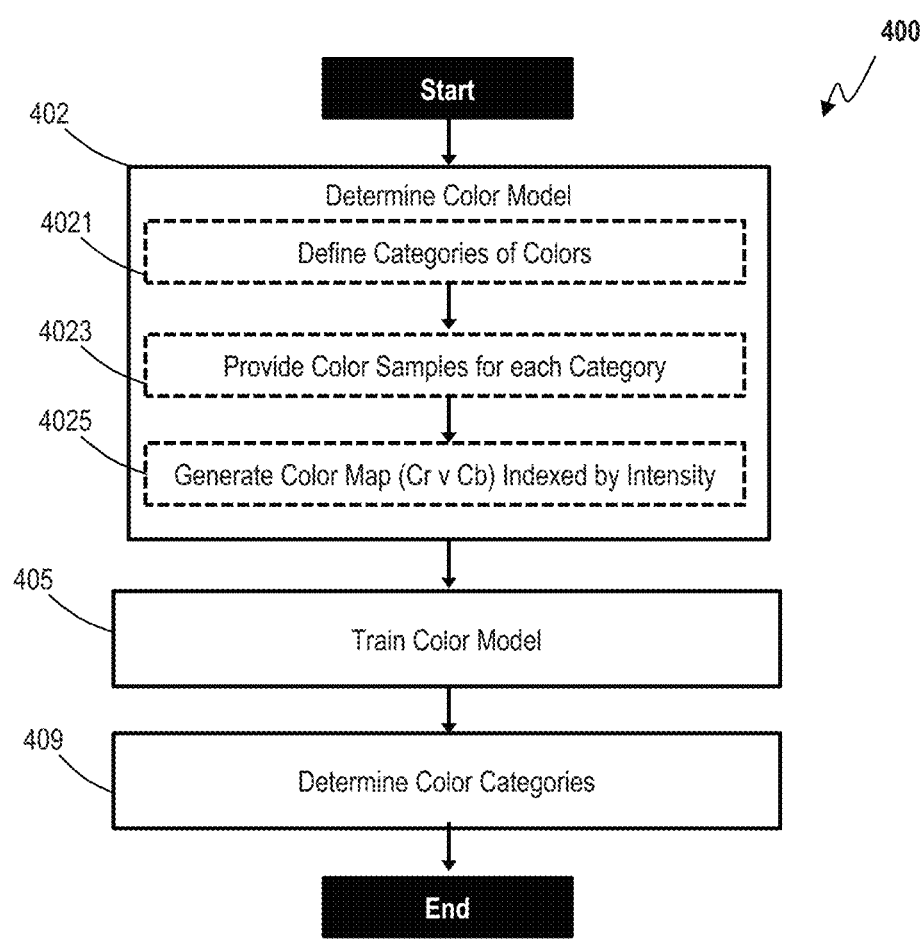
FIG. 4 illustrates a flow diagram of an exemplary process for determining color categorization metadata in accordance with aspects of the present disclosure.

FIG. 4 illustrates a flow diagram of an exemplary process 400 for determining color categorization metadata in accordance with aspects of the present disclosure. At 402, the process 400 determines a color model. In embodiments, determining the color model includes defining a number (e.g., a set) of predetermined color categories at 4021. Additionally, defining the color model includes providing the model color samples corresponding to each of the categories defined in 4021 at 4023. Further, defining the color model includes generating color maps at 4025 corresponding to each of the categories defined in 4021 using the color sample provided in 4023. In accordance with aspects of the present disclosure, the color maps define a combination of color ranges (e.g., Cr, Cb) corresponding to each of the predetermined color categories in a color scheme (e.g., Chroma subsampling) Further, each of the color maps is indexed by a corresponding luminance value (e.g., Y) of the respective color sample.

At 405, the process 400 trains to the color model defined at 402. In embodiments, training includes providing reference images (e.g., stored in reference data 144) having known colors and luminance values. At 409, the color model defined at 402 and trained at 409 is applied to images obtained from one or more retailers (e.g. retailers 10) and one or more users (e.g., users 15), which determines the colors in the images (e.g., Cr, Cb), as well as a respective luminance value (Y) for each of the colors. In embodiments, the determination is performed for one or more pixel areas included in each of the images.

Figure 5:
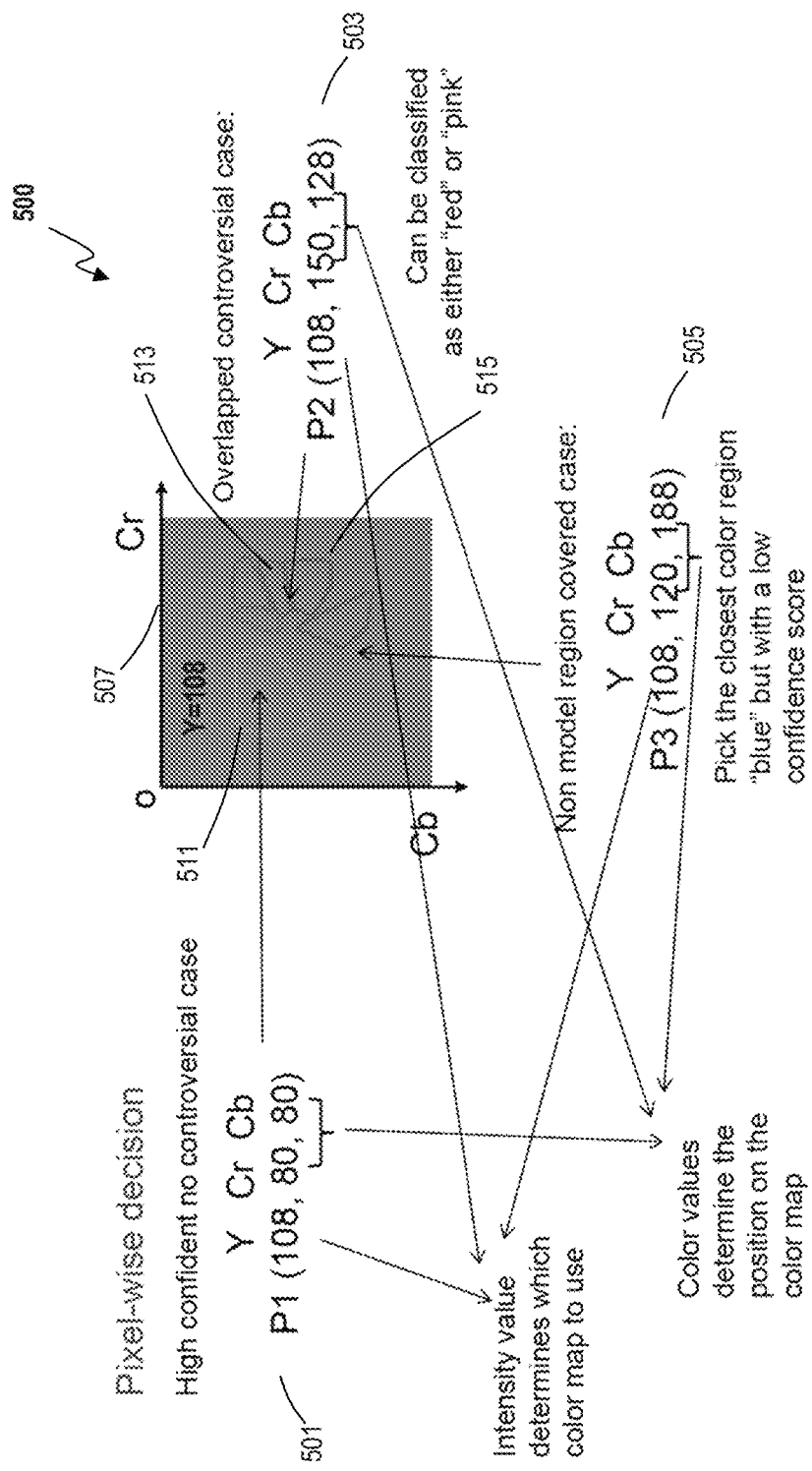
FIG. 5 illustrates a functional flow diagram of an exemplary process for determining color categorization metadata in accordance with aspects of the present disclosure.

FIG. 5 illustrates a functional flow diagram of an exemplary process 500 for determining color categorization metadata in accordance with aspects of the present disclosure. The process 500 may be the same or part of the process 400 previously described. The process 500 categorizes the color of an item (e.g., an apparel item, such as a top) using a color maps of a color model, which may be the same as those previously described herein. In embodiments, the color model comprises a database of color maps (e.g., mapping Cr versus Cb) indexed by their respective luminance values (Y). Thus, in accordance with aspects of the present disclosure, the process 500 categorizes the color of a particular item in an image by determining the color (Cr, Cb) and luminance value (Y) (e.g., 501, 503, or 505) of an area of the image (e.g., a pixel or a co-located group of several pixels). Based on the luminance value (Y) of the area, the process 500 retrieves a color map 507 from the database having the closest (e.g., the same or nearest) luminance value. Using the retrieved color map 507, the process 500 determines the category of color (e.g., green, blue, red) corresponding to areas 511, 513, 515 (e.g., each having a ranges of Cr value vs. a range Cb values) of the categories within the color map 507. For example, the color 501 may have a Cr, Cb values corresponding to a position within "green" area 511 of the color map 507. Accordingly, the process 500 selects the predetermined color category (e.g., "green") corresponding to the color range in the color map 507.

Additionally, in accordance with aspects of the present disclosure, the process 500 can assign a confidence score to the selected color category based on the nearness of the colors 501, 503, 505, to the edges of the color areas 511, 513, 515 in the color map 507. For example, the color 501 may be in the center of the green area 511 of the color map 507. Accordingly, the process 500 can assign a high confidence value. In comparison, the color 503 may be on the edge of both a red region 513 and a pink region 515 of the color map 507. Accordingly, the process 503 may categorize the color 503 as both "red" and "pink," each having a low confidence value with respect to the confidence value of color 501.

Figure 6:
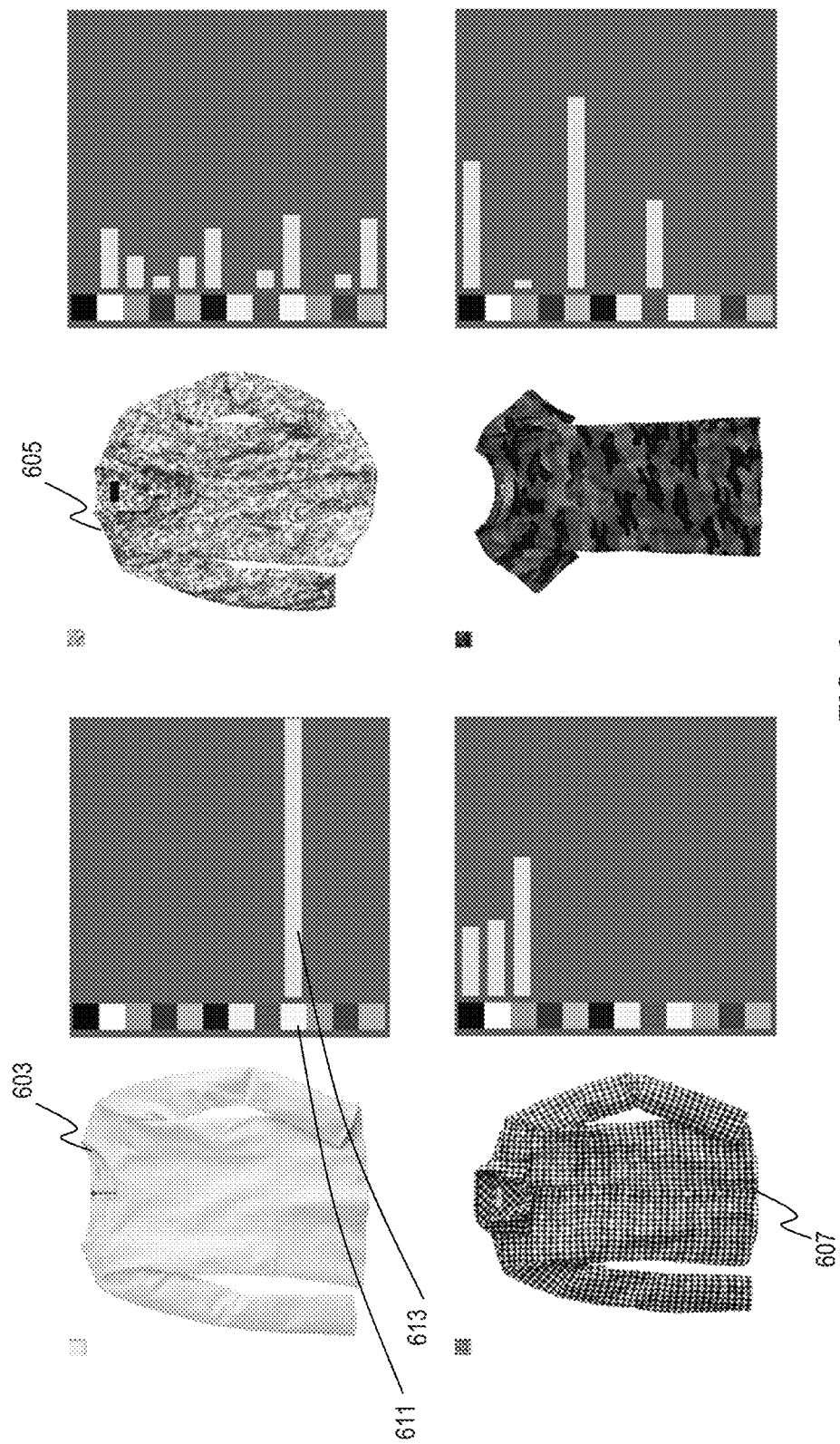
FIG. 6 illustrates exemplary color categorization metadata in accordance with aspects of the present disclosure.

FIG. 6 illustrates examples of color categories output and confidence values by the process 400 and/or process 500 in accordance with aspects of the present disclosure. As is shown in FIG. 6, a particular item can be associated with one or more color categories. For example, a monochrome shirt 603 can belong to a single color category 611 and have a high confidence value 613. Further, a multicolor shirt 605 or a patterned shirt 607 can be associated with a number of such categories, each having a relatively lower confidence value than the monochrome item 603. Thus, by categorizing items using multiple areas, efficient and accurate categorizations of multiple colors can be obtained. Thereby, systems in accordance with the present disclosure can quickly match different items with great accuracy.

Figure 7:
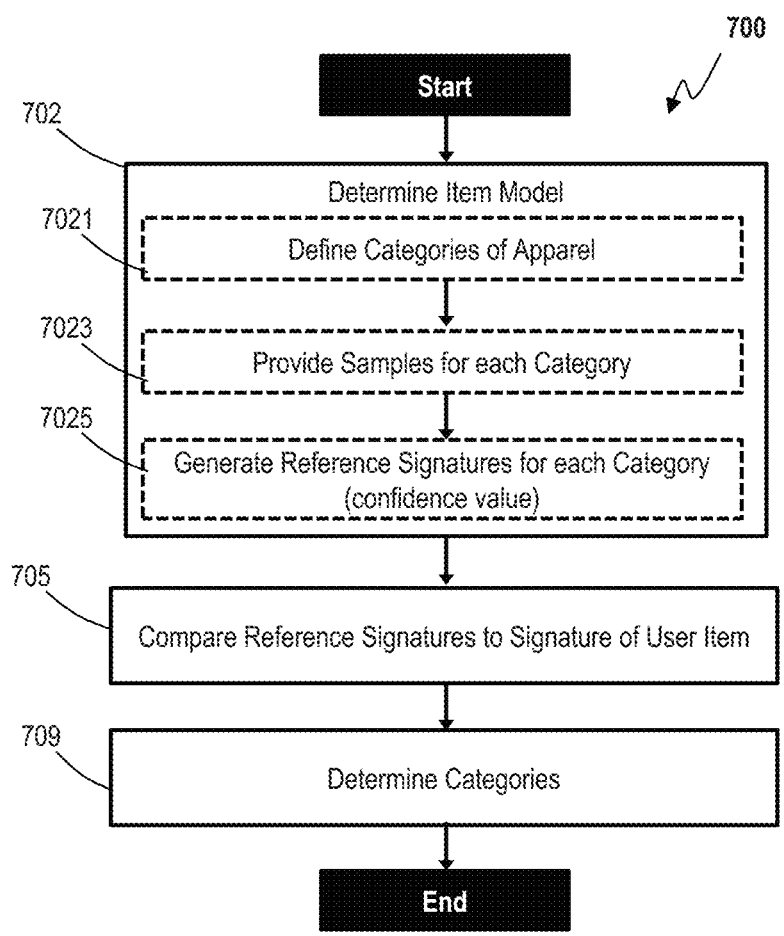
FIG. 7 illustrates an flow diagram of an exemplary process for determining a category of an item in accordance with aspects of the present disclosure.

FIG. 7 illustrates an exemplary flow diagram of a process 700 for determining the category of an apparel item (e.g. long sleeve shirt, etc.) in accordance with aspects of the present disclosure. At 702, the process 700 defines an item model. In embodiments, defining the color model includes defining a number (e.g., a set) of predetermined item categories (7021) through shape definitions, machine learning, or some combination of both. Additionally, defining the category model (7025) includes providing the item samples (7023) corresponding to each of the categories defined in 7021. Further, defining the category model includes generating category maps corresponding to each of the categories defined in 7021 using the item sample provided in 7023.

At 705, the item model defined and trained at 702 is compared to images obtained from one or more retailers (e.g. retailers 10) or one or more users (e.g., users 15), which determines the item type in the images (709). Further, in embodiments, defining an item type determined in 709, the model can also determine a view (e.g., front, back, side, etc.) in addition to category of item (e.g. dress, top, etc.) or other metadata (stripes, sleeve length, etc.).

Figure 8:
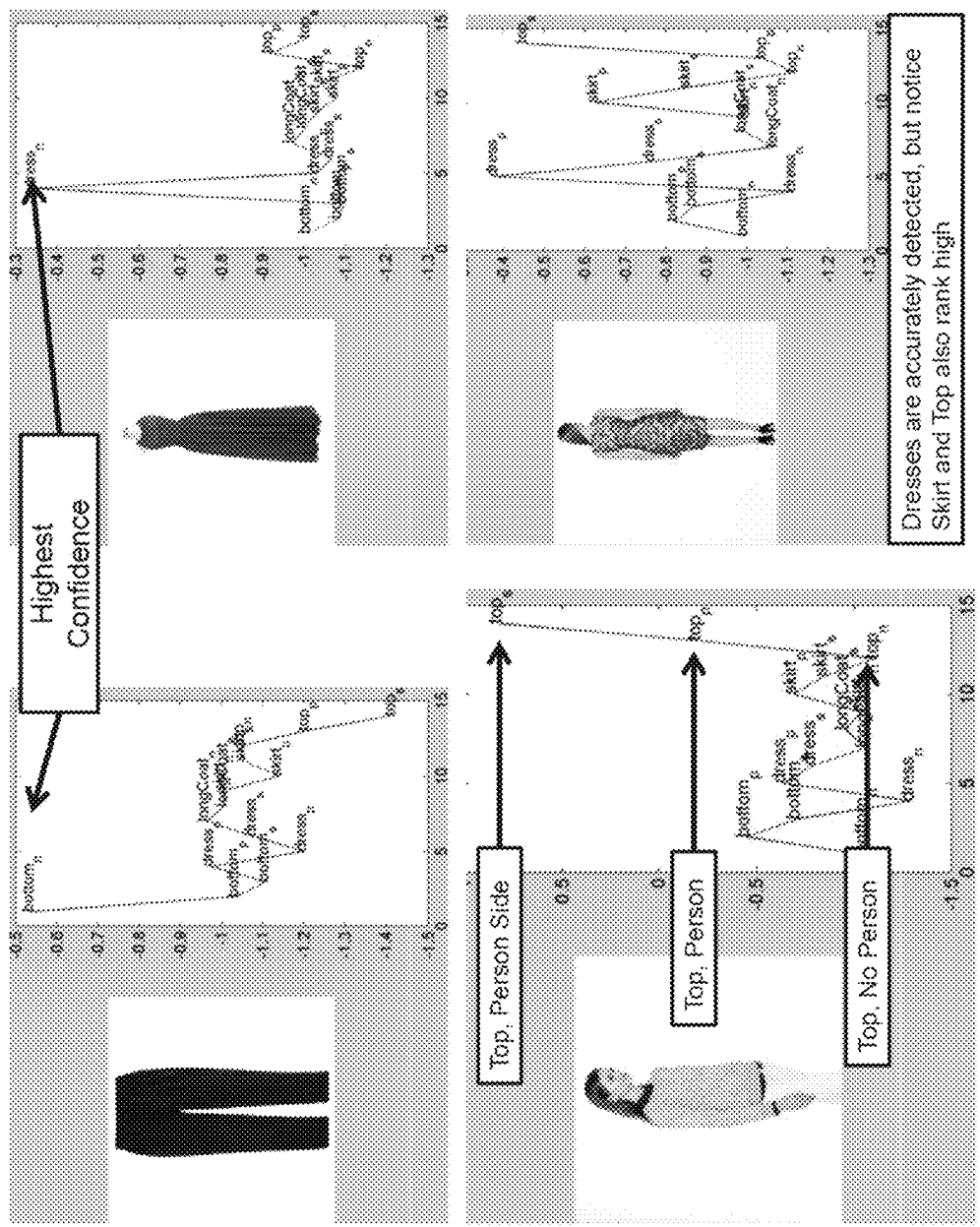
FIG. 8 illustrates exemplary type categorization metadata in accordance with aspects of the present disclosure.

FIG. 8 illustrates examples of outputs from the process 700 shown in FIG. 7. In embodiments, the output of the item model (e.g., at 709) is a mapping between the predefined item categories (e.g., at 7021) and a confidence value (e.g., −1.5 to −0.5) for a particular item in an image as belonging to each of the item categories (e.g., bottom, dress, long coat, skirt, shorts, etc.).

Figure 9:
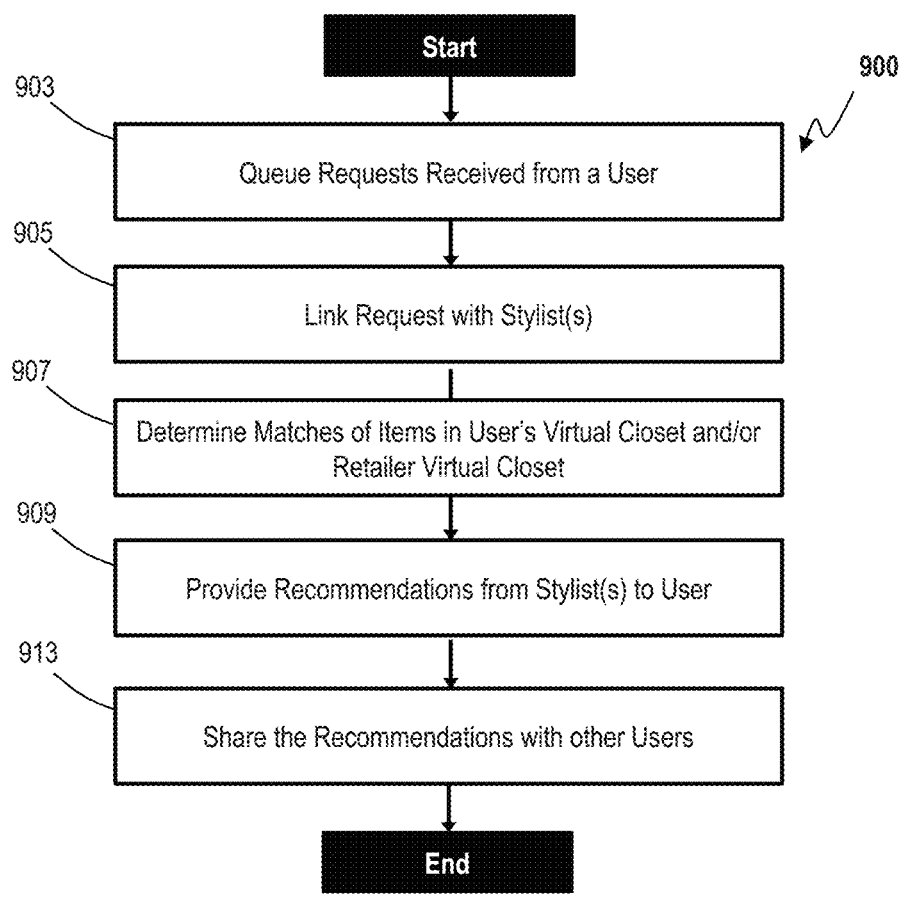
FIG. 9 illustrates a flow diagram of an exemplary recommendation process in accordance with aspects of the present disclosure.

FIG. 9 illustrates a flow diagram of a process 900 for matching items and making recommendations in accordance with aspects of the present disclosure. At 903, the process 900 (e.g., processor 140 executing matching module 155) queues requests (e.g., styling requests 85) to the styling system (e.g., styling system 25) from a user (e.g., one of users 15). Each request can include one or more items that the user wishes a stylist to use as a basis for making recommendation and can be further used for matching items or similar items. The metadata generated through apparel and color categories can be used to aid the stylist to quickly find style matches to the item or items in the user's request. If the stylist is a virtual stylist, the metadata is used to create recommendations to the user. In embodiments, all incoming requests from users can be placed into a request queue that a number of stylists (e.g., stylists 20) can access the requests. In other embodiments, requests may first pass to stylists of retailers (e.g., one of retailers 10) before going to a stylist of the styling system or ultimately a virtual stylist. For example, the stylist of the styling system may be able to respond to the user's request, but only after a predetermined amount of time passes to give stylists of the retailers a chance to respond, and thereby not overload stylists of the styling system. In yet another embodiment, a user may be able to explicitly make a request of a specific retailer, regardless of stylist. In another embodiment, the user can explicitly make a request of a specific stylist regardless of retailer or stylist of the styling system.

At 905, the process establishes a link between the user and a stylist. In embodiments, to link a stylist with a user, either the user or the stylist can establish can enter the email address of the other. For example, a stylist at a retailer can assist a user to create an account with the styling system. In doing so, the stylist can link his/her stylist account (e.g., stored in stylist data 131) to the user such that the user may perform a direct request. In other embodiments, the user can make a general request without specifically directing the request to a stylist or a retailer; the user request may be placed into the request queue. Multiple stylists may be able to respond, but it may be the case that only a single stylist can do so. Additionally or alternatively, the user can preselect a number (e.g., 5) of favorite retailers from which the user will be linked by the styling system. In embodiments, the styling system automatically chooses the retailers for user based on brands included in the closet of the user (e.g., stored in user data 129). For example, the styling system can choose the 5 least busy retailers (e.g., based on information in retailer data 127); or the system can choose a first set of retailers based on the user' closet and 2 additional retailers randomly to expand the user's awareness of other brands and/or retailers. If no retailer stylists are available the system would automatically chose the stylist of the styling system or a virtual stylist, if available.

At 907, the stylist using the system (e.g., via matching module 155 executed by processor 140) can determine items in the user's wardrobe and/or the retailer's inventory that match the requested item based on a comparison of their respective metadata. In embodiments, the styling system can generate a list of one or more items for reference by the stylist. In other embodiments, the stylist may use the generated metadata of the user's wardrobe and/or retailer's inventory to search and find style matches to the item or items in the user's request in a time-efficient manner. For example, the styling system may provide a confidence-ranked listing of matching clothing from the retailers or the personal wardrobe of the user.

At 909, the process provides recommendations from the stylist to the user based on style matches determined at 907. After being linked, the stylist may have access to the user's information. For example, the stylist can view the user profile which may include: body size and dimensions, preferred brands, preferred price range, closet items, and saved outfits, which may also provide alternatives in the outfit. For example, if the user sends a request to build an outfit around a pair of pants, the stylist may provide additional options for shirts in addition to the one that defines the outfit. If the user does not specify an item to build around, the stylist may still provide alternatives. The stylist may add commentary onto the outfit that is being created. The stylist may save the outfit whereupon it may be added to the user's virtual closet for later review by the user (which may kick off a notification to the user).

In embodiments, it may be desirable to limit the recommendation options of stylist of a retailer. In other words, a retailer may only be able to recommend pairings involving items from the user's closet or the retailer's offerings themselves. While the platform supports openness, retailers' desires may be factored into the styling system, as retailers may not want to promote other retailer's products (e.g., one retailer's employees would be perusing the catalogs of other retailers). Additionally, the stylists may not profit on such an offering, so there may be little financial incentive. Similarly, if any stylist from a given retailer can recommend items from any other retailer, then a bias problem may arise in which certain retailer stylists are selected more frequently by users (due to the cachet of having an outfit designed by, e.g., a famous or otherwise desirable brand or retailer, even though that retailer doesn't recommend apparel from that brand or retailer) than others, thereby potentially reducing the crowd advantage.

At 913, the user can share the recommendations with other users. The sharing mechanism may resemble a social messaging scheme, with a one-way following. However, the person being followed may be able to block the followers (and therefore may need to be able to see list of people following them). There may be three levels of privacy: Private, Followers, and Public. Private may mean no one can see it. Followers may mean only the unblocked followers can see it. Public may mean open to world. A user may also be able to follow other people. When looking at a person, a stream of posted items may be available (may involve browsing their closet, or a date sorted list of what they shared, or other). Messaging between users may be a feature (i.e., outside of comments). Thus, a user may share a whole wish list or suitcase, or may share just items/outfits. A further embodiment to the sharing process can be to allow users to perform styling system operations on other users without the need for retailer stylists, styling system stylists, or virtual stylist.

From the perspective of the user, the process 900 may proceed as follows. The user owns a pair of camo boots. The user can photograph the boots using a camera on their mobile phone and upload the photograph to the user's closet. The user can then send a request to the styling system stating, "I would like to wear these boots out on Friday night in the city. Can you help me create some outfits around them? They are a little out of my comfort zone so I am looking for something fun and cute but comfortable." In response, the user can receive confirmation from the styling system that their request has been sent. A stylist can be notified that a request from the user has been submitted. The stylist now reads the request and sees the item I want styled around it. The stylist reads the user's profile and browses the user's closet to get a better idea of the user's style. The stylist then creates outfits based on items already in my closet (assuming I have a fairly full closet) and then creates outfit options around all entirely new items based off the user's brand preferences in the user's profile. The stylist may send her "favorite" outfit back first with comments on the back: "I chose this look because the style really comfortable and feminine and the shirt is subtle allowing the boots to complete the outfit without being too flashy." The stylist may have the option of saving the outfit to their closet before sending to the user. The stylist sends to user and receives a notification that "outfits delivered successfully." Another box appears prompting "style Dakota1?" The stylist moves on to a next user and repeats the above process. The user receives a notification "you've been styled!" The user may be immediately taken to the recommended new outfits. One embodiment is that the user may see the first outfit and flip over for more information. She reads what the stylist inspiration was behind the outfit. She can now scroll through the different outfits that she was given. The user then stops on outfit number 4 and isn't crazy about the shirt suggested. The user clicks on the photo of the shirt and selects the swap button. A new shirt is recommended. The swapping can happen by examining the metadata and performing an automatic swap based on the style matches generated by the system or by returning to the stylist who performs the swap. If the user doesn't like that and decides to swap again. This time the user remembers a shirt she already owns may look cute. She selects "my closet" then "shirts" and selects her shirt she already owns. This is now the new outfit and she clicks save. The user has the option to "keep" or "delete" any of the outfits suggested and the items within them. The user will be prompted if she deletes an item from an outfit then that will create and incomplete outfit. The system may prompt, "Would you like to add new item now?" If she chooses yes, then she goes through options from her closet or catalog. If the user chooses no, an icon will appear in the corner indicating an incomplete outfit.

From a perspective of the stylist, the process 900 may proceed as follows. The stylist may be a professional fashion consultant employed as a personal shopper for a large fashion retailer. The stylist may a lot of repeat and loyal customers but most of them are from out of town. The stylist can uploaded their purchase history into their closet in the styling system. If the retailer introducers a new item for sale (e.g., a new Navy Blazer), the stylist may determine that the new item is one that the user would enjoy and would fit in her closet well. The stylist can then access the user's closet and start browsing through her items. Then, using items already included in the user's closet, the stylist create outfits based on the new item. The stylist can save one or more such outfits before sending them to the user. The user receives a notification stating that "your stylist has created outfits for you!" User opens outfits and flips the first outfit created "I thought this blazer would look great with the pants you recently purchased. It's perfect for a cool summer evening."

The above features have been described in detail with particular reference to certain preferred embodiments thereof, but it will be understood that variations and modifications can be effected within the spirit and scope of the disclosure. One of skill in the art will appreciate that each of the above are exemplary implementations and are not to be construed as a limitation on the scope of the present disclosure.

The flowcharts, block diagrams, and/or illustrations in the Figures illustrate the architecture, functionality, and operation of possible implementations of systems, methods and computer program products according to various embodiments of the present invention. In this regard, each block in the flowcharts, block diagrams, and/or illustrations may represent a module, segment, or portion of code, which comprises one or more executable instructions for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in any ensuing claims are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What we claim is:

1. A system comprising:
   a processor;
   a storage system storing data of one or more retailers, data of one or more users, data of one or more stylists, and a plurality of virtual closets, the plurality of virtual closets associating a plurality of images of apparel items with respective metadata of the apparel items; and
   a computer-readable data storage device storing computer-readable program instructions that, when executed by the processor, control the system to perform operations comprising:
      obtaining, via an information network, a first image of a first apparel item and text describing the first apparel item;
      determining descriptive metadata of the first apparel item by extracting information from the text;
      determining categorization metadata of the first apparel item by analyzing the first image;
      storing the first image, the descriptive metadata, and the categorization metadata in a first virtual closet of the plurality of virtual closets; and
      providing, via the information network, a recommendation of an outfit based on the first virtual closet from a first stylist of the one or more stylists to a first user of the one or more users,
   wherein determining the categorization metadata comprises:
      determining one or more color categories of the first apparel item by comparing a color of one or more pixels in the first image of the first apparel item to a color model comprised of a plurality of color maps, the plurality of color maps including a plurality of different areas representing respective color ranges;
      selecting a first color map of the plurality of color maps having a color matching or closest to the color of the one or more pixels in the first image of the first apparel item; and
      determining that the color of the one or more pixels in the first image of the first apparel item is within a first area of the plurality of different areas in the first color map; and
   wherein the determining categorization metadata further comprises determining a category of the first apparel item and a viewing angle of the first apparel item in the first image by comparing the first image of the first apparel item to an item model defining a plurality of item categories and a plurality of viewing angles.

2. The system of claim 1, wherein the operations further comprise normalizing the first image before determining the categorization metadata.

3. The system of claim 2, wherein the normalizing the first image comprises scaling, cropping, removing a background, and adjusting a luminance of the first image.

4. The system of claim 1, wherein the plurality of virtual closets comprise virtual closets of the one or more retailers and virtual closets of the one or more users.

5. The system of clam 4, wherein the virtual closet of the at least one retailer comprises images of items available for purchase from the at least one retailer.

6. The system of claim 4, wherein the virtual closet of the at least one user comprise images of items in a personal wardrobe owned by the at least one user.

7. The system of claim 1, wherein the descriptive metadata of the first apparel item comprises, type, use category, material, and size.

8. The system of claim 1, wherein the determining one or more color categories of the first apparel item further comprises determining a confidence value corresponding to the position of the color included in the first apparel item relative to the first area.

9. The system of claim 1, wherein the item model comprises confidence values associated with a plurality of item types.

10. The system of claim 1, wherein the operations further comprise providing one or more outfit recommendations to the first user from a first stylist of the one or more stylists based on the matches.

11. The system of claim 10, wherein the operations further comprise sharing the one or more the outfit recommendations with a plurality of other users.

12. A system comprising:
   a processor;
   a storage system storing a virtual closet; and
   a computer-readable data storage device storing computer-readable program instructions that, when executed by the processor, control the system to perform operations comprising:
      receiving an image of an apparel item;
      determining metadata associated with the image of the apparel item the metadata including one or more color categories or one or more apparel types;
      updating the virtual closet with the image of the apparel item and the metadata; and
      providing a recommendation of an outfit to a user based on the first virtual closet,
   wherein determining the metadata comprises:
      determining the one or more color categories of the first apparel item by comparing a color of one or more pixels in the image of the apparel item to a color model comprised of a plurality of color maps, the plurality of color maps including a plurality of different areas representing respective color ranges;
      selecting a first color map of the plurality of color maps having a color matching or closest to the color of the one or more pixels in the image of the apparel item; and determining that the color of the one or more pixels in the image of the apparel item is within a first area of the plurality of different areas in the first color map; and wherein the determining categorization metadata further comprises determining a category of the apparel item and a viewing angle of the apparel item in the first image by comparing the image of the apparel item to an item model defining a plurality of item categories and a plurality of viewing angles.

13. The system of claim 1, wherein:
the plurality of color maps categorize the apparel items based on color and luminance; and
the color model indexes the color maps by the respective luminance of the color maps.

14. The system of claim 13, wherein selecting the first color map comprises retrieving a first color map of the plurality of color maps based on a luminance value first area of the first apparel item.

15. A method comprising:
obtaining, by a computing device, via an information network, an image of an apparel item and text describing the apparel item;
determining, by the computing device, descriptive metadata of the apparel item by extracting information from the text;
determining, by the computing device, categorization metadata of the apparel item by analyzing the image;
storing, by the computing device, the image, the descriptive metadata, and the categorization metadata in a virtual closet; and
providing, by the computing device, via the information network, a recommendation of an outfit based on the virtual closet from a stylist to a user,
wherein determining the categorization metadata comprises:
determining one or more color categories of the apparel item by comparing a color of one or more pixels in the image of the apparel item to a color model comprised of a plurality of color maps, the plurality of color maps including a plurality of different areas representing respective color ranges;
selecting a first color map of the plurality of color maps having a color matching or closest to the color of the plurality of pixels in the image of the apparel item; and
determining that the color of the one or more pixels in the image of the apparel item is within a first area of the plurality of different areas in the first color map; and wherein the determining categorization metadata further comprises determining a category of the apparel item and a viewing angle of the apparel item in the image by comparing the image of the apparel item to an item model defining a plurality of item categories and a plurality of viewing angles.

16. A system comprising:
a processor;
a computer-readable data storage device storing computer-readable program instructions that, when executed by the processor, control the system to perform operations comprising:
obtaining, via an information network, a first image of a first item and text describing the first item;
determining descriptive metadata of the first item by extracting information from the text;
determining categorization metadata of the first item by analyzing the first image;
storing the first image, the descriptive metadata, and the categorization metadata in a first dataset of the plurality of datasets; and
determining a combination of items in the first dataset and the plurality of datasets using the descriptive metadata and the categorization metadata,
wherein determining the categorization metadata comprises:
determining one or more color categories of the first item by comparing a color of one or more pixels in the first image of the first item to a color model comprised of a plurality of color maps, the plurality of color maps including a plurality of different areas representing respective color ranges;
selecting a first color map of the plurality of color maps having a color matching or closest to the color of the one or more pixels in the first image of the first item; and
determining that the color of the one or more pixels in the first image of the first item is within a first area of the plurality of different areas in the first color map; and
wherein the determining categorization metadata further comprises determining a category of the first item and a viewing angle of the first item in the first image by comparing the first image of the first item to an item model defining a plurality of item categories and a plurality of viewing angles.

* * * * *